United States Patent

[11] 3,560,648

[72] Inventor Sotirios C. Kitsopoulos
Summit, N.J.
[21] Appl. No. 756,188
[22] Filed Aug. 29, 1968
[45] Patented Feb. 2, 1971
[73] Assignee Bell Telephone Laboratories, Incorporated
Murray Hill, N.J.
a corporation of New York

[54] SAMPLED DATA AUTOMATIC GAIN CONTROL CIRCUIT
11 Claims, 9 Drawing Figs.

[52] U.S. Cl. .......... 178/7.3
[51] Int. Cl. .......... H04n 5/56
[50] Field of Search .......... 178/7.3DC, 7.5DC; 328/173, 175

[56] References Cited
UNITED STATES PATENTS

| | | | |
|---|---|---|---|
| 2,936,335 | 5/1960 | Urtel .......... | 178/7.3 |
| 3,207,998 | 9/1965 | Corney et al. .......... | 178/7.3 |
| 3,237,110 | 2/1966 | Kaye .......... | 328/175 |
| 3,309,615 | 3/1967 | Baldwin et al. .......... | 328/173 |

*Primary Examiner*—Robert L. Griffin
*Assistant Examiner*—John C. Martin
*Attorneys*—R. J. Guenther and William L. Keefauver

ABSTRACT: Precise automatic gain control is achieved by sampling the amplitude of individual ones of the synchronizing pulses of a received composite video signal. Spurious gain changes are minimized by deriving drive signals for initiating sampling of the synchronizing pulse amplitude from each of the individual synchronizing pulses.

INVENTOR
S. C. KITSOPOULOS
BY
ATTORNEY

SAMPLED DATA AUTOMATIC GAIN CONTROL CIRCUIT

BACKGROUND OF THE INVENTION

This invention relates to automatic gain control circuits and, more particularly, to precision automatic gain control circuits in which spurious gain variations are minimized.

In transmission systems, it is often necessary to maintain receiver signal strength within some predetermined limits to ensure quality reproduction of the transmitted information. Many automatic gain control (AGC) systems have been proposed to fulfill this function. Typical among these is the "-keyed" or "sampled" automatic gain control systems utilized, for example, in television receivers. In these systems, video signal level is determined by comparing a sample of the received signal with a set reference signal. Preferably the received signal is sampled during the blanking interval, thereby rendering the sample independent of video content.

Problems arise in AGC systems when the signal to be sampled is distorted, for example, because of clipping or failure to clamp the signal to a given reference level. Spurious gain changes, which result from sampling a distorted signal, cause disturbances in a scene depicted by the signal.

SUMMARY OF THE INVENTION

These and other problems are overcome, in accordance with the inventive principles described herein, by selectively detecting periodic intervals of similar signal characteristics, for example, the individual synchronizing pulses of a received composite video signal, to initiate automatic gain control action. Sync pulses are used to generate gain control signals only after it has been established that they are substantially undistorted and after they have been clamped to a given reference level. Sampling control signals are thus derived only from those individual synchronizing pulses which meet the prescribed standards. Thus, the amplitude of each sync pulse for which a sampling control signal has been generated only is sampled and compared with a predetermined signal level to effect gain control.

More specifically, an automatic gain control circuit, in accordance with this invention, comprises a variable gain clamp circuit to which a received video signal is applied. A sampling control signal is generated only in response to the coincidence of a first output signal from the variable gain clamp circuit, representative of a clamped video signal, and a second output signal from the variable gain clamp circuit, which indicates that the synchronizing pulses of the received video signal have been properly clamped to a prescribed reference level. A sampling control signal is then generated and employed to actuate, for a brief interval, a high-speed sample and hold circuit. Generation of control signals is inhibited during intervals in which the detected sync pulses are not clamped. An applied signal, clamped to the prescribed level, is thus sampled at a predetermined time to produce a signal proportional to the synchronizing pulse amplitude. The stored signal is compared with a predetermined reference signal. The amplified difference between the two signals, if any, is applied, via a filter, to the variable gain clamp circuit where it is used to adjust the gain of the system for maintaining a constant video signal level at the output of the AGC circuit. By virtue of the hold function of the circuit, system gain is controlled even though a number of subsequent sync pulses are distorted, and hence rejected for use in establishing a the system gain level.

These and other objects and advantages of the invention will be more fully understood from the following detailed description of an illustrative embodiment thereof taken in connection with the appended drawings.

DETAILED DESCRIPTION OF THE INVENTION

A "keyed" or "sampled" automatic gain control system relies on a sample of a received signal to determine what variation in gain, if any, is required for maintaining the signal at a prescribed level. Thus, the sampling must be representative of the magnitude of the received signal. That is to say, deleterious effects which may result from sampling a signal which is distorted, for example, because of clipping or failure to clamp it to a given reference level, must be avoided.

Figure 1:
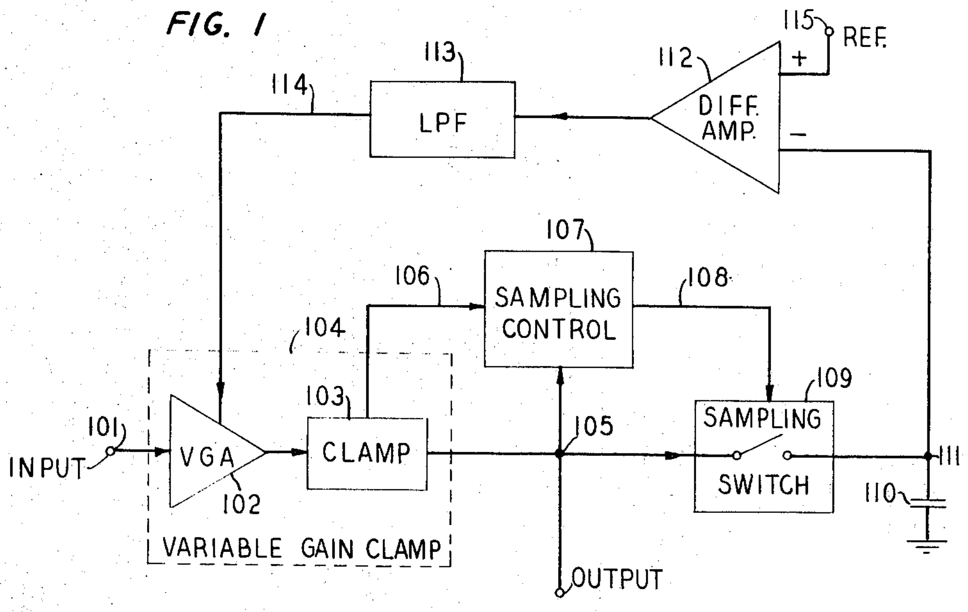
FIG. 1 shows in block schematic form an automatic gain control circuit in accordance with the principles of the present invention.
Figure 3:
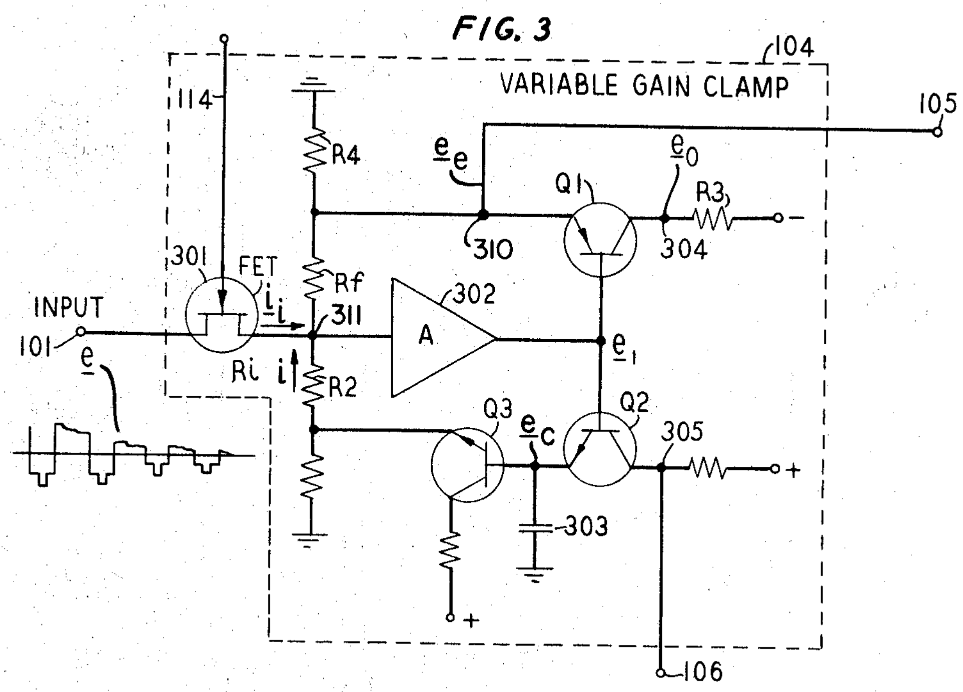
FIG. 3 shows in block schematic form details of the variable gain clamp circuit of FIG. 1.

FIG. 1 shows in simplified block form a sampled data automatic gain control system which, in accordance with the invention, selectively samples a received signal to minimize spurious gain variations. Independence from video signal content is achieved while obtaining rapidly responding error compensated AGC action. A received video signal is applied to controlled variable gain amplifier 102 via input terminal 101. Amplifier 102 may be any desired type of controlled gain amplifier well known in the art. The gain controlled output of amplifier 102 is applied to clamp circuit 103 where the horizontal synchronizing (sync) pulse tips of the applied video signal are clamped, in well known fashion, to a predetermined reference level. Clamp circuit 103 develops, in addition to a clamped video signal, a "clamp indication" signal which denotes that the sync pulse tips have been clamped to the given reference level. Moreover, it is desirable, although not necessary, that the variable gain and clamping functions be performed in one circuit. Thus, amplifier 102 and clamp circuit 103 may be incorporated into a single circuit, namely, variable gain clamp 104. A circuit capable of performing both these functions is shown in FIG. 3, to be discussed later.

The clamped composite video output of clamp circuit 103 is applied, via circuit path 105, to sampling control circuit 107 and sampling switch 109. The clamp indication signals, corresponding to individual ones of the sync pulses, are applied to sampling control 107, via circuit path 106. Sampling control 107 responds, in accordance with the invention, to the coincident application of the individual sync pulses and their corresponding clamp indication signals and generates signals which are applied, via circuit path 108, to the control input of sampling switch 109. Conversely, if either the sync pulse or its associate clamp indication signal is missing, sampling switch 109 is not activated. One embodiment of sampling control network 107 is shown in detail in FIG. 2 and is discussed below.

Portions of a video sync signal, and the pedestal on which it is positioned, namely, the "front-porch," "sync tip," and "-back-porch," provide readily measurable datum levels for determining signal strength. For example, either the front-porch or the back-porch may be used as a reference level against which sync tip level may be measured. Preferably, the back-porch associated with the sync pulse delivered by clamp 104 is sampled, via sampling switch 109, when an energizing pulse is delivered to the switch by control 107, and stored on capacitor 110. The back-porch signal, stored on capacitor 110, is applied to differential amplifier 112 where its level is compared to that of a predetermined reference signal, supplied via terminal 115. Note that the level of the signal stored on capacitor 110 remains essentially constant until the next sample is taken. Therefore, the output from differential amplifier 112 is essentially constant during those intervals in which the video signal is distorted, for example, because of failure to clamp the sync tips, and for those which no new samples are taken. Differential amplifier 112 is of a type which has sufficiently high input impedance to avoid loading or appreciably affecting the signal level stored on capacitor 110. The amplified difference signal developed by differential amplifier 112 is applied to low pass filter 113 where noise or other interference is removed. The filtered signal is thereafter applied, via circuit path 114, to control the gain of amplifier 102, thus establishing the automatic gain control loop. Accordingly, the input signal is held at the established level until a new, undistorted, sample is produced. Gain controlled video signals are supplied via an output terminal connected to circuit path 105.

Figure 2:
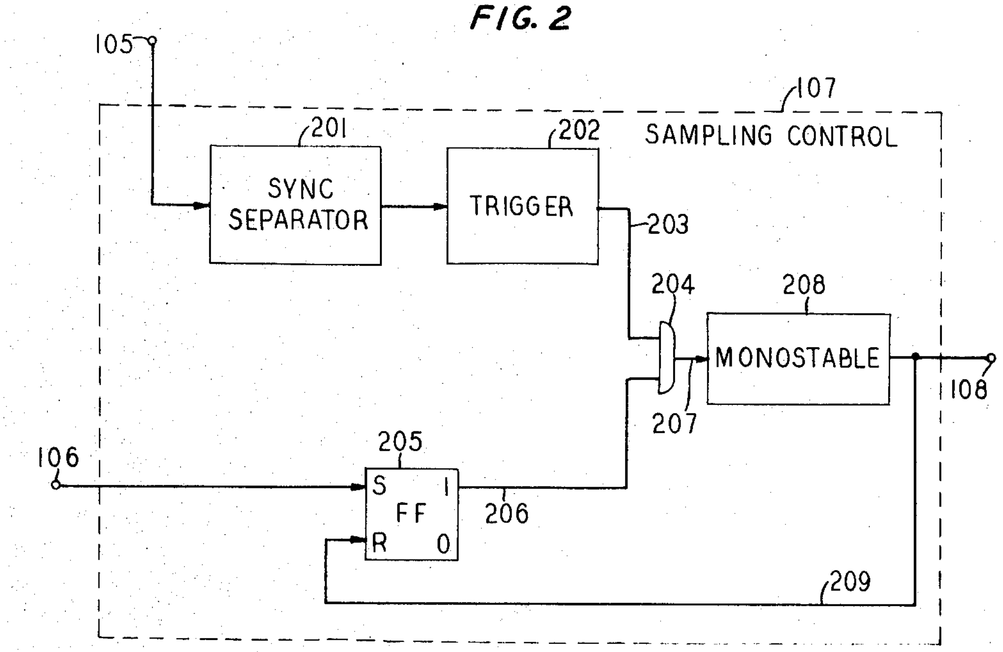
FIG. 2 illustrates, in accordance with the invention, details of the sampling control circuit of FIG. 1.

FIG. 2 illustrates, in accordance with the principles of this invention, the details of sampling control circuit 107. As noted above, the clamped composite video signal is applied to sampling control circuit 107, via circuit path 105. Horizontal sync pulses are separated from the composite video signal in sync separator 201. Trigger pulses are developed by detecting the trailing edge of each of the separated sync pulses in trigger pulse generator 202, which may be a differentiating network. Trigger 202 may also incorporate a threshold network, for example, a Schmitt trigger, which responds only to sync pulses having an amplitude greater than some predetermined level. No trigger pulse therefore, is generated when the sync pulse amplitude is below this level, for example, because of it being clipped. The developed trigger pulses are applied to one input of AND gate 204.

The clamp indication signal associated with each of the sync pulses is applied to sampling control circuit 107 via circuit path 106 where it is utilized to set flip-flop 205. A trigger signal developed by flip-flop 205 is applied to a second input of AND gate 204. Thus, if both the sync trigger pulse and the clamp indication signal are present and in coincidence, an output signal from AND gate 204 triggers monostable multivibrator 208. Conversely, if both or either the sync trigger pulse or its associated clamp indication signal is missing, monostable 208 is not triggered and no signal is issued to cause the video signal to be sampled.

Monostable multivibrator 208 is utilized for generating the pulse used to actuate sampling switch 109 (FIG. 1). Its action may be delayed a predetermined amount of time, so that the back-porch portion of the synchronizing pulse is sampled. The sequence of events is shown in FIG. 4. The signal developed by monostable multivibrator 208 is also fed back, via circuit path 209, to reset flip-flop 205. Thus, the sampling cycle is completed.

FIG. 3 shows the details of variable gain clamp circuit 104. A received video signal *e* to be controlled in magnitude and clamped to a reference level is applied, via terminal 101, to one terminal of a voltage controlled variable resistance element, Ri, for example, field effect transistor (FET) 301. FET 301 is utilized primarily as a variable resistance element to effect the desired variable gain function to be described herein. Gain control and clamping functions are achieved by utilizing high gain inverting amplifier 302, which may be of the operational type. The circuit path comprising Rf and the emitter base junction of $Q_1$, and the circuit path comprising R2, $Q_3$, capacitor 303 and the base emitter junction of $Q_2$ effect clamping of the applied signal *e*. A clamped version of composite video signal *e* applied to variable gain clamp 104 via input terminal 101 is available at either of points 304 or 310, the collector and emitter terminals of $Q_1$. Initially, $Q_1$ is ON and $Q_2$ is OFF, Thus, the negative-going portions of input signal *e* cause the output of amplifier 302, namely $e_1$, to go positive. When the input signals are at their negative most portions, i.e., the sync tips, $e_1$ is generally of sufficient magnitude to cut off $Q_1$ and to turn on $Q_2$. During the sync tip interval, i.e., $Q_2$ ON, capacitor 303 is charged to a potential which is proportional to the maximum negative excursion of input signal *e*. Mathematically, the potential developed across capacitor 303 is, $$e_c = (e_{max}\,R2/\,Ri) - V_{BE}, \qquad (1)$$

where $e_{max}$ is the maximum negative potential of input signal $e$ and $V_{BE}$ is the base-to-emitter voltage drop of $Q_3$.

When capacitor 303 is charged to $e_c$ and the sync tip interval of input $e$ has ended, transistor $Q_2$ turns off. Capacitor 303 continues to hold its charge established during the sync tip interval because of the high impedance load presented by $Q_3$, which acts as a buffer amplifier.

Current $i$ is supplied to summing node 311 of amplifier 302 via $Q_3$ and R2, which just offsets input current $i_i$, developed by $e$ and Ri, by an exact amount needed for DC restoration. Mathematically, the DC restoration current is $$i = e_{max}\,/\,R2. \qquad (2)$$

Accordingly, a clamped version of composite video signal $e$ is developed at either of points 310 or 304. At point 310, the clamped signal, namely $e_e$ (FIG. 4A), is an inverted amplified version of input $e$ and is clamped to ground potential. Signal $e_o$ developed at point 304 on the other hand is an in-phase amplified version of $e$ and is clamped to the negative supply potential. Output signal $e_e$ is developed at emitter terminal 310 of $Q_1$ and supplied to circuit path 105. An additional output signal $e_o$, having a higher gain than $e_e$, is developed at collector terminal 304 of $Q_1$.

Assuming high gain A, and high beta for transistor $Q_1$, the gain of variable gain clamp 104, taken at the collector of $Q_1$, i.e., at point 304, is represented approximately by

0001 NO CARD FOR THIS ILLUSTRATION.

n

Thus, the circuit gain varies inversely as the resistance value of Ri. Since the drain to source resistance of FET 301 which, in this example, is an N-channel type, increases with an increase in the magnitude of the gate potential, the gain of the circuit decreases in response to an increase in magnitude of the control signal applied to the gate terminal of FET 301, via circuit path 114. Obviously, a P-channel type FET may be utilized by simply changing the polarity of the gate potential.

Figures 4A, 4B, 4C, 4D, 4E, 4F:
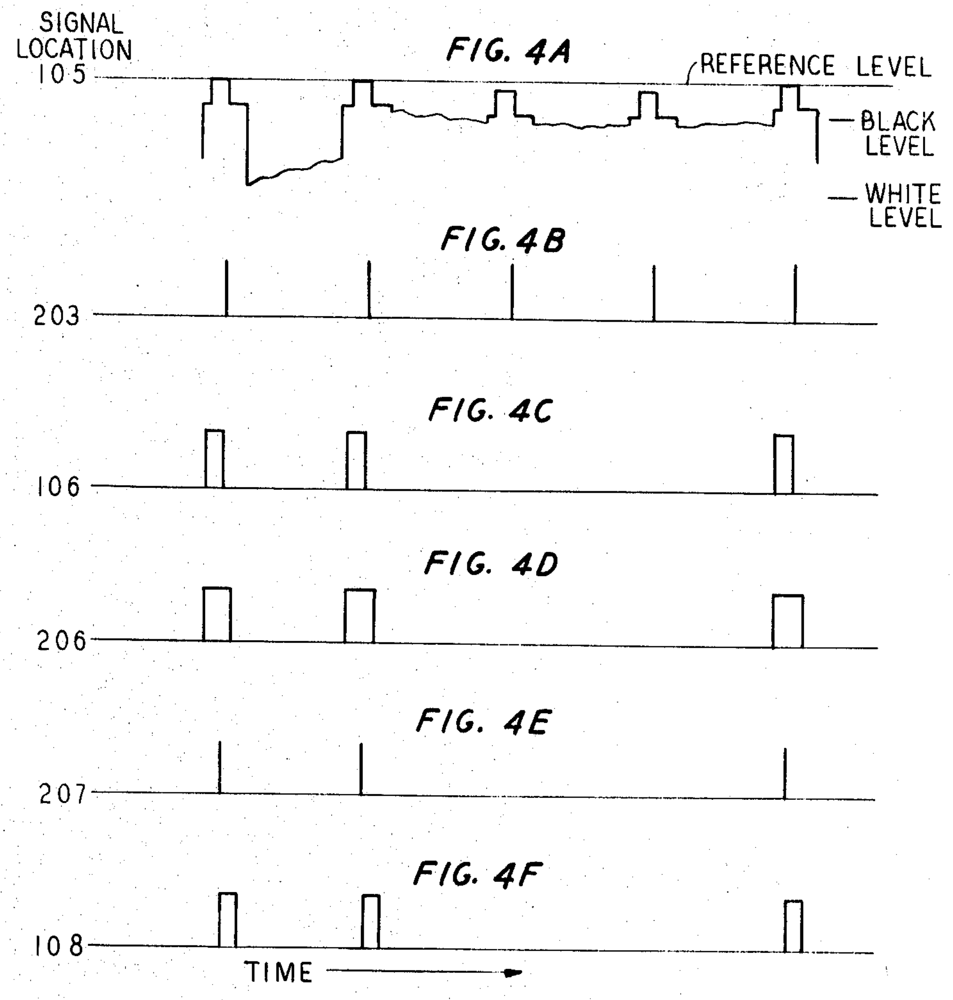
FIGS. 4A—4F graphically depicts a timing sequence for a particular applied video signal.

Variable gain clamp 104 also develops a clamp indication signal representative that the sync tips have been clamped. This signal is developed at point 305, and hence in circuit path 106, by the charging current supplied to capacitor 303 when transistor $Q_2$ is driven ON by the sync pulse tips. When the sync tips are not clamped, no signal is developed at point 305. Failure to clamp the sync tips occurs as a result of an abrupt change in video signal content, e.g., when the video level changes from a white level to a black level, as indicated in FIG. 4A. In such an instance, the sync tips of composite video signal $e$, supplied to input terminal 101 (FIG. 3), drift toward the zero datum because input $e$ is an AC signal, which, as is well known, has an average value of zero. Because of the finite discharge time constant of clamping capacitor 303, instantaneous changes in the video signal cause the sync tips to drift away from the reference level. Moreover, because the potential developed on capacitor 303, during this interval, for example, when the video signal changes from white to black, is greater than the peak level of the sync pulses developed at $e_1$, transistor $Q_2$ is not driven ON, and thus no voltage pulse is developed at point 305. A variable gain clamp circuit essentially the same as variable gain clamp 104 is described in greater detail in the copending U.S. Pat. application, Ser. No. 680,877, filed Nov. 6, 1967, by N. R. Baum, S. C. Kitsopoulos and D. E. Lynn.

The operation of the AGC circuit, in accordance with the invention, can best be explained by referring to the timing sequence diagrams of FIG 4 A video signal is applied to variable gain clamp 104 (FIG. 1) where the amplitude of the signal is adjusted and the sync tips are clamped to a predetermined reference level. The clamped video output, as shown in FIG. 4A, developed in variable gain clamp 104 appears in circuit path 105. The third and fourth pulses of this signal are shown, greatly exaggerated, as not being clamped. The clamped video signal is applied to sampling control circuit 107 and to sampling switch 109. A clamp indication signal, as explained above, developed in variable gain clamp 104 is also applied to sampling control circuit 107, via circuit path 106. This signal is shown in FIG. 4C. No clamp indication signal is developed for the third and fourth pulses because the sync tips are not clamped to the reference level.

Turning briefly to FIG. 2, the composite clamped video signal is applied to sync separator 201, which separates the sync pulses from the video content. The sync pulses are thereafter applied to trigger circuit 202 where their magnitude and trailing edge are detected and pulses, shown in FIG. 4B, are developed which are applied to AND gate 204 via circuit path 203. The associated clamp indication signals are applied to set flip-flop 205, shown in FIG. 4D, are applied to the second input of AND gate 204 via circuit path 206. It is noted that there is no output from flip-flop 205 when the sync pulses are not clamped to the reference level. Thus, there is no output from AND gate 204 when the sync pulses are not clamped. However, when both the clamp indication signal and the trigger signal developed by the corresponding sync pulse are applied to gate 204, an output signal is developed. The output of AND gate 204, shown in FIG. 4E, is applied to trigger monostable multivibrator 208. In response to the trigger signal, monostable multivibrator 208 develops a pulse which has finite duration, as shown in FIG. 4F. This pulse is utilized to drive sampling switch 109 (FIG. 1) for sampling the back-porch level of the synchronizing pulses. This signal is also utilized to reset flip-flop 205.

A signal representative of the sampled back-porch level is stored on capacitor 110 (FIG. 1). The stored signal is applied to differential amplifier 112, where it is compared with a predetermined reference signal. The output of differential amplifier 112 is filtered via low pass filter 113 to eliminate noise or other distortion. The filtered signal is thereafter applied to the gate terminal of FET 301 (FIG. 3) to vary its drain to source resistance, thereby effecting automatic gain control.

Thus, from this example, it is apparent that the signal level is automatically adjusted in accordance with sync pulse level. MOreover, it is apparent that the signal is not sampled when the sync tips are not clamped to the reference level so that constant gain is maintained and possible disturbances in a display developed by the signal are eliminated.

Other possible errors may be evidenced when the sync tips are not present because of clipping or some other distortion. It can readily be seen that when the sync tips are not present, no signal will be applied to AND gate 204 and thus no signal will be developed to drive sampling switch 109. Therefore, in accordance with the invention, the AGC loop will remain "in suspension" during the interval that the sync tips are missing and the possibility of AGC "lockup" is greatly minimized.

The above-described arrangements are, of course, merely illustrative of the application of the principles of this invention. Numerous other arrangements may be devised by those skilled in the art without departing from the spirit or scope of the invention.

I claim:

1. An automatic gain control circuit which comprises, in combination:

- a variable gain circuit for clamping an applied signal to a selected reference level;
- controllable means for selectively sampling the amplitude of said clamped signal;
- means responsive to said clamped signal for generating a signal to control selectively said sampling means; and
- means responsive to said sampled signal for developing a signal to control the gain of said variable gain clamp circuit.

2. The circuit as defined in claim 1, wherein said means for generating said sampling control signal includes:

- means for separating a selected signal portion from said clamped signal; and
- means responsive to said separated signal for selectively generating a trigger signal.

3. The circuit as defined in claim 1, wherein said variable gain clamp circuit further generates a signal as an indication that said received signal is clamped.

4. The circuit as defined in claim 3, wherein:

- said received signal is a composite video signal having synchronizing pulses; and
- said clamp indication signal indicates that individual ones of said synchronizing pulses are clamped to said reference level.

5. The circuit as defined in claim 4, wherein said sampling control signal generating means includes:

- means for separating said synchronizing pulses from said composite video signal; and
- means responsive to said separated synchronizing pulses and to said clamp indication signals for generating a sampling control signal only when each of said separated synchronizing pulses is in coincidence with its corresponding clamp indication signal.

6. The circuit as defined in claim 4, wherein said sampling control signal generating means includes:

- means for separating said synchronizing pulses, characterized by leading and trailing edges, from the composite video signal;
- means responsive to the trailing edge of each of said separated synchronizing pulses for developing first trigger signals;
- means responsive to said clamp indication signals for developing second trigger signals;
- AND gate means responsive to said first and said second trigger signals for developing third trigger signals; and
- pulse generator means responsive to said third trigger signals for selectively generating delayed pulse signals, said delay interval being predetermined so that a selected portion of said synchronizing pulse is sampled in amplitude.

7. An automatic gain control circuit which comprises:

- a variable gain amplifier having input and output terminals;
- means for applying a received composite video signal to the input of said amplifier;
- a clamp circuit having first and second outputs for clamping a gain controlled video signal developed at the output of said amplifier to a selected reference level and for developing a signal which is an indication that said video signal is clamped to said reference level, said clamped video signal being developed at said first output terminal and said clamp indication signal being developed at said second output terminal;
- controllable means for selectively sampling the amplitude of a predetermined portion of said clamped video signal;
- means responsive to said clamped video signal and to said clamp indication signal for generating a signal to control selectively said sampling means, said control signal means being responsive only to a selected coincidence of said clamped video signal and said clamp indication signal; and
- means responsive to said sampled signal for developing a signal to control the gain of said variable gain amplifier.

8. The circuit as defined in claim 7, wherein said clamp indication signal denotes that individual ones of synchronizing pulses of the composite video signal are clamped to said reference level:

- wherein said sampling control signal generating means includes;
- means for separating said synchronizing pulses from the composite video signal;
- means selectively responsive to each of said separated synchronizing pulses for generating first trigger signals;
- means responsive to said clamp indication signal for generating second trigger signals;
- AND gate means responsive to coincident application of said first trigger signals and their associated second trigger signals for generating third trigger signals; and
- a pulse generator responsive to said third trigger signals for developing delayed sampling control signals, said delay being set at a predetermined interval so that a selected portion of said synchronizing pulses is sampled in amplitude

9. A controlled gain transmission circuit which comprises:

means for clamping an applied signal having periodic intervals of similar signal characteristics to a prescribed reference level;

means for determining that individual portions of said applied signal occurring during said periodic intervals have been clamped to said reference level, said determining means generating a signal representative of the portions of said applied signal which have been clamped;

means responsive to the signal generated by said determining means for generating a control signal representative of the amplitude of said applied signal by comparing said applied signal to a predetermined signal level only during said periodic intervals in which said applied signal has been clamped; and means for utilizing said control signal to adjust the amplitude of said applied signal until a new control signal is produced.

10. The circuit as defined in claim 9 wherein said control signal generating means includes means responsive to said determination signal for inhibiting the comparison of said applied signal with said predetermined signal during intervals in which said applied signal is not clamped.

11. The circuit as defined in claim 9 wherein said control signal generating means includes means responsive to said determination signal for initiating the comparison of said applied signal to said predetermined signal.